US012565094B2

(12) United States Patent
Kamijukkoku et al.

(10) Patent No.: US 12,565,094 B2
(45) Date of Patent: Mar. 3, 2026

(54) VEHICLE LOWER PART STRUCTURE

(71) Applicant: TOYOTA JIDOSHA KABUSHIKI KAISHA, Toyota (JP)

(72) Inventors: Kyohei Kamijukkoku, Toyota (JP); Yohsuke Komada, Toyota (JP); Toshiaki Sato, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 398 days.

(21) Appl. No.: 18/480,721

(22) Filed: Oct. 4, 2023

(65) Prior Publication Data

US 2024/0190229 A1 Jun. 13, 2024

(30) Foreign Application Priority Data

Dec. 8, 2022 (JP) ................................. 2022-196600

(51) Int. Cl.
B60K 1/04 (2019.01)
(52) U.S. Cl.
CPC ........ B60K 1/04 (2013.01); B60K 2001/0438 (2013.01)
(58) Field of Classification Search
CPC ........................... B60K 1/04; B60K 2001/0438
See application file for complete search history.

(56) References Cited

U.S. PATENT DOCUMENTS

| | | | | |
|---|---|---|---|---|
| 11,370,287 B2 * | 6/2022 | Tsuyuzaki | ............ | B62D 21/157 |
| 2022/0379967 A1 * | 12/2022 | Natsume | .............. | B62D 21/157 |
| 2025/0236340 A1 * | 7/2025 | Chikita | .................. | B62D 21/03 |

FOREIGN PATENT DOCUMENTS

| | | | | |
|---|---|---|---|---|
| CN | 109292007 B | * | 5/2021 | .............. B60K 1/04 |
| JP | 2021-113006 A | | 8/2021 | |

* cited by examiner

*Primary Examiner* — Faye M Fleming
(74) *Attorney, Agent, or Firm* — SoraIP, Inc.

(57) ABSTRACT

The vehicle lower part structure includes a cross member, and a connecting member that is formed in a closed cross-sectional shape and connects the vehicle width direction outer end portion of the cross member and the rocker. A first fragile portion and a second fragile portion extending in the front-rear direction from the outermost side to the inner side in the vehicle width direction are formed on the upper wall of the connecting member, and a third fragile portion extending in the front-rear direction is formed on the lower wall of the connecting member between the first fragile portion and the second fragile portion in the front view, and a distance along the vehicle width direction between the first fragile portion and the third fragile portion is shorter than a distance along the vehicle width direction between the second fragile portion and the third fragile portion.

4 Claims, 5 Drawing Sheets

VEHICLE LOWER PART STRUCTURE

CROSS-REFERENCE TO RELATED APPLICATION

This application claims priority to Japanese Patent Application No. 2022-196600 filed on Dec. 8, 2022, incorporated herein by reference in its entirety.

BACKGROUND

1. Technical Field

The present disclosure relates to a vehicle lower part structure.

2. Description of Related Art

In a vehicle on which a battery case in which a battery is housed, is mounted on a side below a cross member in the up-down direction of the vehicle, a structure is conventionally known in which, when a side collision of the vehicle occurs, a seat bracket is rotated to deform an outer end portion of the cross member in the vehicle width direction downwards, so that a collision load is absorbed (see, for example, Japanese Unexamined Patent Application Publication No. 2021-113006 (JP 2021-113006 A)).

SUMMARY

However, in the above-described structure, the position of the cross member in the front-rear direction of the vehicle needs to be the same as the position of the rear portion of the seat bracket that supports the front seat. That is, it is necessary to arrange the cross member close to the rear seat. In this case, there is a problem that the toe of the occupant seated in the rear seat hits the cross member via the floor panel, and as a result, the foot space of the occupant seated in the rear seat is narrowed.

An object of the present disclosure is to provide a vehicle lower part structure capable of absorbing a collision load when a side collision of a vehicle occurs, without narrowing a foot space of an occupant seated in a rear seat.

In order to achieve the above object, a vehicle lower part structure according to a first aspect of the present disclosure includes: a battery case mounted on a side below a floor panel of a vehicle in an up-down direction of the vehicle; a cross member extending in a vehicle width direction, between the floor panel and the battery case, and forward of a rear portion of a support member in a front-rear direction of the vehicle, the support member supporting a front seat of the vehicle; a rocker extending in the front-rear direction of the vehicle on an outer side of the cross member in the vehicle width direction; and a connecting member that is constituted in a closed sectional shape and that connects an outer end portion of the cross member in the vehicle width direction and the rocker. A first fragile portion and a second fragile portion extending in the front-rear direction of the vehicle in order from an outermost side to an inner side in the vehicle width direction in an upper wall of the connecting member, are constituted, and a third fragile portion extending in the front-rear direction of the vehicle in an lower wall of the connecting member between the first fragile portion and the second fragile portion in a front view, is constituted. A distance between the first fragile portion and the third fragile portion along the vehicle width direction is shorter than a distance between the second fragile portion and the third fragile portion along the vehicle width direction.

According to the first aspect of the present disclosure, at the time of the side collision of the vehicle, a collision load directed inward in the vehicle width direction is input to the connecting member via the rocker. Here, the first fragile portion and the second fragile portion extending in the front-rear direction of the vehicle are formed in order from the outermost side to the inner side in the vehicle width direction, in the upper wall of the connecting member. The third fragile portion extending in the front-rear direction of the vehicle is formed in the lower wall of the connecting member between the first fragile portion and the second fragile portion in the front view. The distance between the first fragile portion and the third fragile portion along the vehicle width direction is shorter than the distance between the second fragile portion and the third fragile portion along the vehicle width direction.

Therefore, when the collision load directed inward in the vehicle width direction is input to the connecting member, the upper wall and the lower wall of the connecting member between the first fragile portion and the second fragile portion are deformed so as to be protruded toward the vehicle upper side. Thus, it is possible to deform the outer end portion of the cross member in the vehicle width direction toward the vehicle lower side, the cross member extending in the vehicle width direction forward of the rear portion of the support member in the front-rear direction of the vehicle, the support member supporting the front seat of the vehicle, and it is possible to deform a substantially center portion of the cross member in the vehicle width direction toward the vehicle upper side. That is, the connecting member and the cross member absorb the collision load at the time of the side collision of the vehicle, without narrowing the foot space of the occupant seated in the rear seat.

Further, in the vehicle lower part structure of a second aspect of the present disclosure that is the vehicle lower part structure according to the first aspect, the third fragile portion is constituted to be more fragile than the first fragile portion and the second fragile portion.

According to the present disclosure of the second aspect, the third fragile portion is formed to be more fragile than the first fragile portion and the second fragile portion. Therefore, when the collision load directed inward in the vehicle width direction is input to the connecting member at the time of the side collision of the vehicle, the upper wall and the lower wall of the connecting member between the first fragile portion and the second fragile portion are easily deformed so as to be protruded toward the vehicle upper side.

Further, in the vehicle lower part structure of a third aspect of the present disclosure that is the vehicle lower part structure according to the first aspect, the first fragile portion, the second fragile portion, and the third fragile portion are a first bead portion, a second bead portion, and a third bead portion, respectively, and a depth of the third bead portion is deeper than a depth of the first bead portion and a depth of the second bead portion.

According to the present disclosure of the third aspect, the first fragile portion, the second fragile portion, and the third fragile portion are the first bead portion, the second bead portion, and the third bead portion, respectively, and the depth of the third bead portion is deeper than the depth of the first bead portion and the depth of the second bead portion. Therefore, when the collision load directed inward in the vehicle width direction is input to the connecting member at the time of the side collision of the vehicle, the upper wall and the lower wall of the connecting member between the first fragile portion (first bead portion) and the second fragile portion (second bead portion) are easily deformed so as to be protruded toward the vehicle upper side.

Further, in the vehicle lower part structure of a fourth aspect of the present disclosure that is the vehicle lower part structure according to any one of the first to third aspects, the connecting member has lower rigidity than the cross member.

According to the present disclosure of the fourth aspect, the connecting member has lower rigidity than the cross member. Therefore, when the collision load directed inward in the vehicle width direction is input to the connecting member, the upper wall and the lower wall of the connecting member between the first fragile portion and the second fragile portion are more easily deformed so as to be protruded toward the vehicle upper side.

As described above, according to the present disclosure, it is possible to absorb the collision load at the time of the side collision of the vehicle without narrowing the foot space of the occupant seated in the rear seat.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
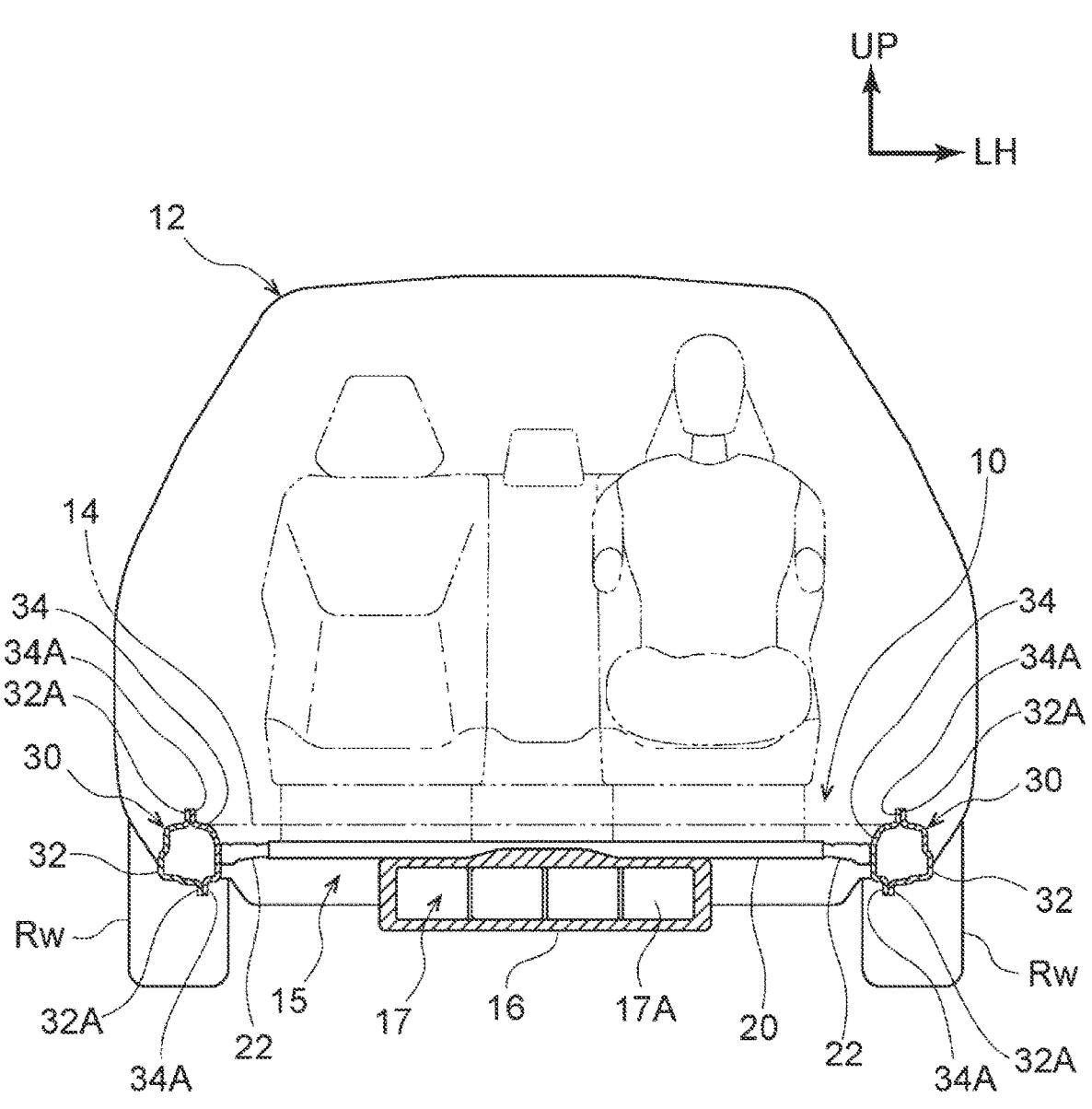
FIG. 1 is a schematic front view showing a vehicle lower part structure according to the present embodiment.

Hereinafter, embodiments of the present disclosure will be described in detail with reference to the drawings. For convenience of explanation, an arrow UP appropriately shown in the drawings is taken as an upward direction of the vehicle. For convenience of explanation, an arrow FR appropriately shown in the drawings is taken as a forward direction of the vehicle. For convenience of explanation, an arrow LH appropriately shown in the drawings is set to the left of the vehicle. For convenience of explanation, an arrow RH appropriately shown in the drawings is set to the right of the vehicle. In addition, in the following description, when the vertical, front-rear, and left-right directions are described without any specific mention, the vertical, front-rear, and left-right directions of the vehicle are assumed to be indicated. Further, the right-left direction is synonymous with a vehicle width direction.

Figure 2:
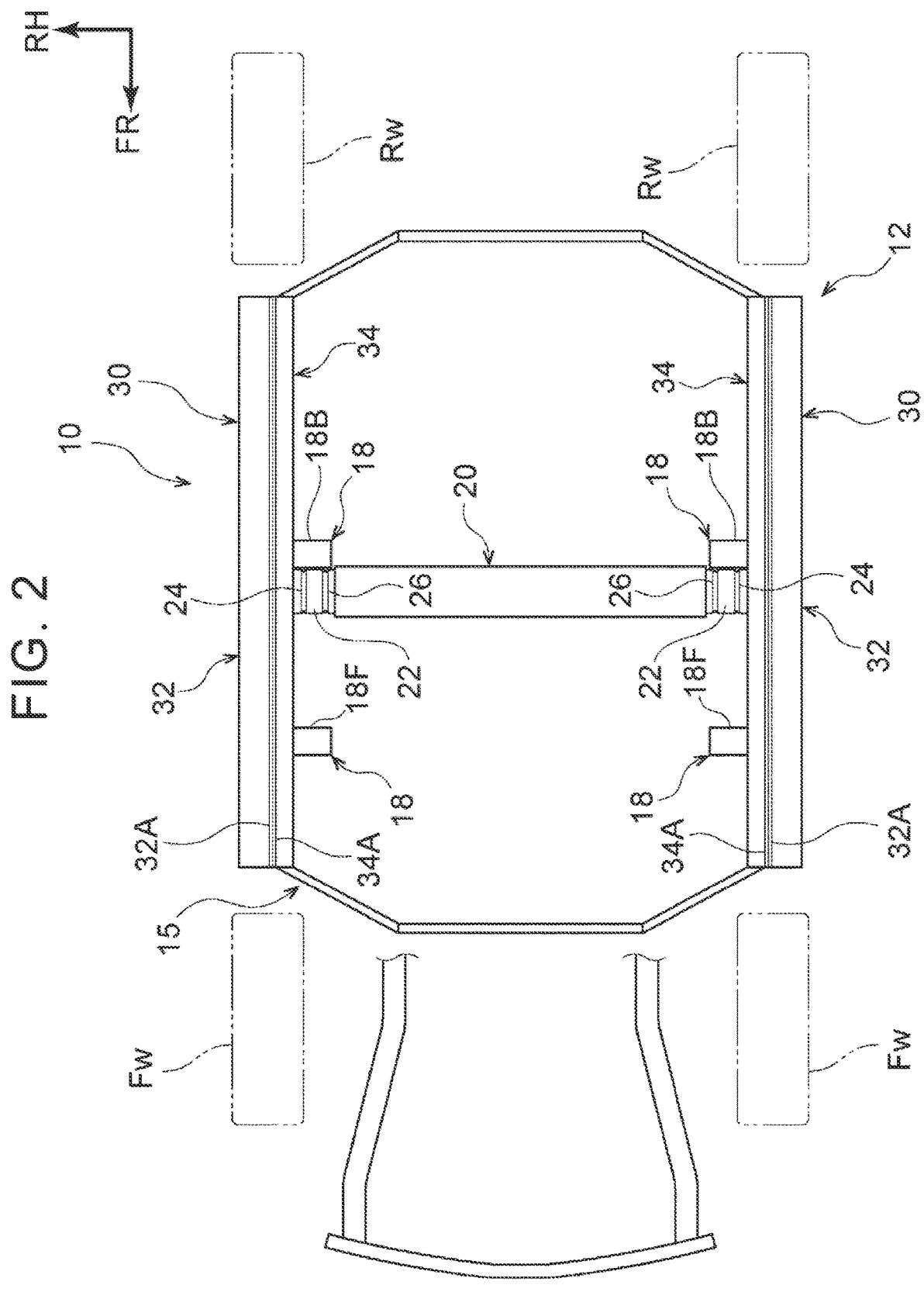
FIG. 2 is a schematic plan view showing a vehicle lower part structure according to the present embodiment.

As shown in FIGS. 1 and 2, the vehicle 12 to which the vehicle lower part structure 10 according to the present embodiment is applied includes a substantially rectangular frame-shaped frame member 15 disposed between an axle (not shown) on the front wheel Fw and an axle (not shown) on the rear wheel Rw in a plan view. A floor panel 14 constituting the floor of the vehicle 12 is disposed above the frame member 15. A battery case 16 is mounted on the lower side of the frame member 15.

That is, the frame member 15 is disposed between the floor panel 14 and the battery case 16 in a front view. In FIG. 2, the floor panel 14 and the battery case 16 are not shown. However, the battery case 16 is supported by the frame member 15 or the like. Further, as shown in FIG. 1, a battery stack 17 in which a plurality of battery cells 17A stacked in the front-rear direction are provided in a plurality of rows in the vehicle-width direction is accommodated in the battery case 16. That is, the vehicle 12 is a battery electric vehicle or a plug-in hybrid electric vehicle.

The frame member 15 includes a metal cross member 20 extending in the vehicle width direction, and a pair of right and left rockers 30 made of metal extending in the front-rear direction on the outer side in the vehicle width direction of the cross member 20. The cross member 20 is formed in a substantially hat-shaped cross section. The cross member 20 is provided at a substantially central portion of the frame member 15 in the front-rear direction (see FIG. 2). In the frame member 15, a cross member (not shown) similar to the cross member 20 is also provided on the front side and the rear side of the cross member 20.

Further, as shown in FIG. 2, the vehicle 12 (cross member, side member, etc., not shown) is provided with a pair of front and rear support members including a front lower portion and a rear lower portion of a seat rail (not shown) that slidably supports a front seat (not shown) and a seat bracket 18. In FIG. 2, only the seat bracket 18 on the outer side in the vehicle width direction is shown. The cross member 20 is disposed on the front side with respect to the rear side portion 18B of the seat bracket 18 and on the rear side with respect to the front side portion 18F of the seat bracket 18 in plan view.

Further, the frame member 15 has a metal extension 22 as a connecting member for connecting the vehicle width direction outer end portion of the cross member 20 and the rocker 30. The extension 22 has a lower rigidity than the cross member 20. That is, the plate thickness of the extension 22 is formed to be thinner than the plate thickness of the cross member 20. Note that other configurations of the extension 22 will be described in detail later.

As shown in FIGS. 1 and 2, the rocker 30 includes a rocker outer panel 32 which is formed in a substantially hat-shaped cross section and extends in the front-rear direction, and a rocker inner panel 34 which is formed in a substantially hat-shaped cross section and extends in the front-rear direction. The upper and lower flange portions 32A of the rocker outer panel 32 and the upper and lower flange portions 34A of the rocker inner panel 34 are joined to each other by welding or the like, so that the rocker 30 has a closed cross-sectional shape.

The extension 22 is formed in a closed cross-sectional shape (a rectangular cylindrical shape having a substantially rectangular cross-section) in a side view. The vehicle width direction inner end portion of the extension 22 is inserted into the vehicle width direction outer end portion of the cross member 20 and is integrally joined by welding or the like. A flanged portion (not shown) is integrally formed at an outer end portion of the extension 22 in the vehicle width direction (at least an outer end portion of the upper wall 22U in the vehicle width direction). The flange portion is joined to the rocker 30 (rocker inner panel 34) by welding or the like.

Figure 3:
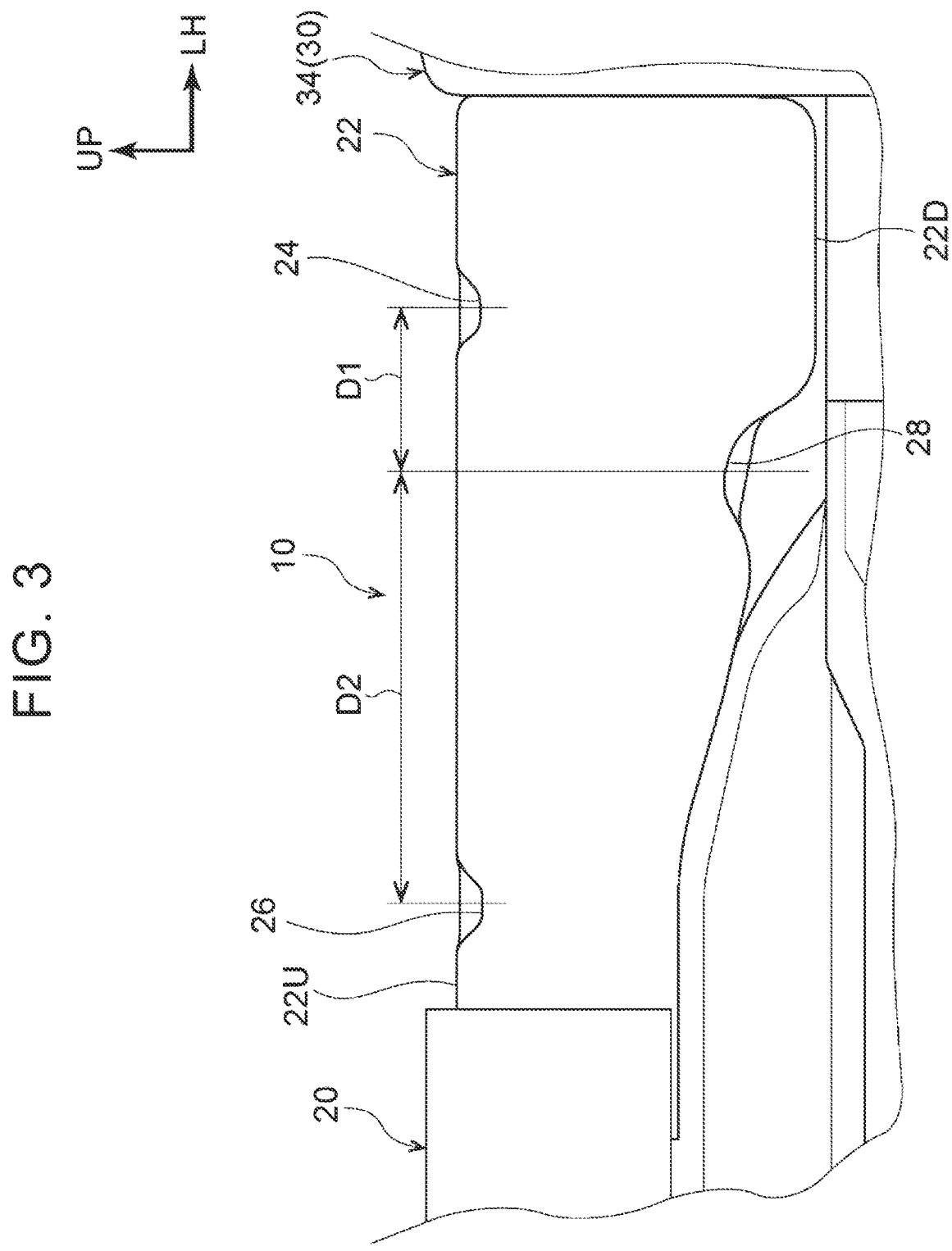
FIG. 3 is an enlarged schematic front view of a vehicle lower part structure before a side collision according to the present embodiment.

As shown in FIG. 3, on the upper wall 22U of the extension 22, a first bead portion 24 as a first fragile portion recessed downward in a substantially arcuate cross section and extending in the front-rear direction, and a second bead portion 26 as a second fragile portion recessed downward in a substantially arcuate cross section and extending in the front-rear direction are formed in this order from the outermost side to the innermost side in the vehicle width direction.

That is, in the upper wall 22U of the extension 22, the first bead portion 24 is formed on the outermost side in the vehicle widthwise direction. A second bead portion 26 is formed at a predetermined interval inside the first bead portion 24 in the vehicle width direction. Further, in the lower wall 22D of the extension 22 between the first bead portion 24 and the second bead portion 26 in the front view shown in FIG. 3, a third bead portion 28 as a third fragile portion recessed upward in a substantially arc-shaped cross section and extending in the front-rear direction is formed.

As shown in FIG. 3, the distance D1 along the vehicle width direction between the first bead portion 24 and the third bead portion 28 is shorter than the distance D2 along the vehicle width direction between the second bead portion 26 and the third bead portion 28. The third bead portion 28 is formed to be more fragile than the first bead portion 24 and the second bead portion 26. That is, the depth (the amount of depression) of the third bead portion 28 is made deeper (larger) than the depth (the amount of depression) of the first bead portion 24 and the second bead portion 26.

Next, the operation of the vehicle lower part structure 10 according to the present embodiment configured as described above will be described.

When the vehicle 12 collides with a side surface of a barrier W (refer to FIG. 5A, FIG. 5B, and FIG. 5C of the drawing) such as a pole, a collision load directed inward in the vehicle width direction is inputted to the extension 22 from the outside in the vehicle width direction through the rocker 30. Here, as shown in FIG. 3, on the upper wall 22U of the extension 22, a first bead portion 24 and a second bead portion 26 extending in the front-rear direction are formed in this order from the outermost side to the inner side in the vehicle width direction, and a third bead portion 28 extending in the front-rear direction is formed on the lower wall 22D of the extension 22 between the first bead portion 24 and the second bead portion 26 in the front view.

Figure 4:
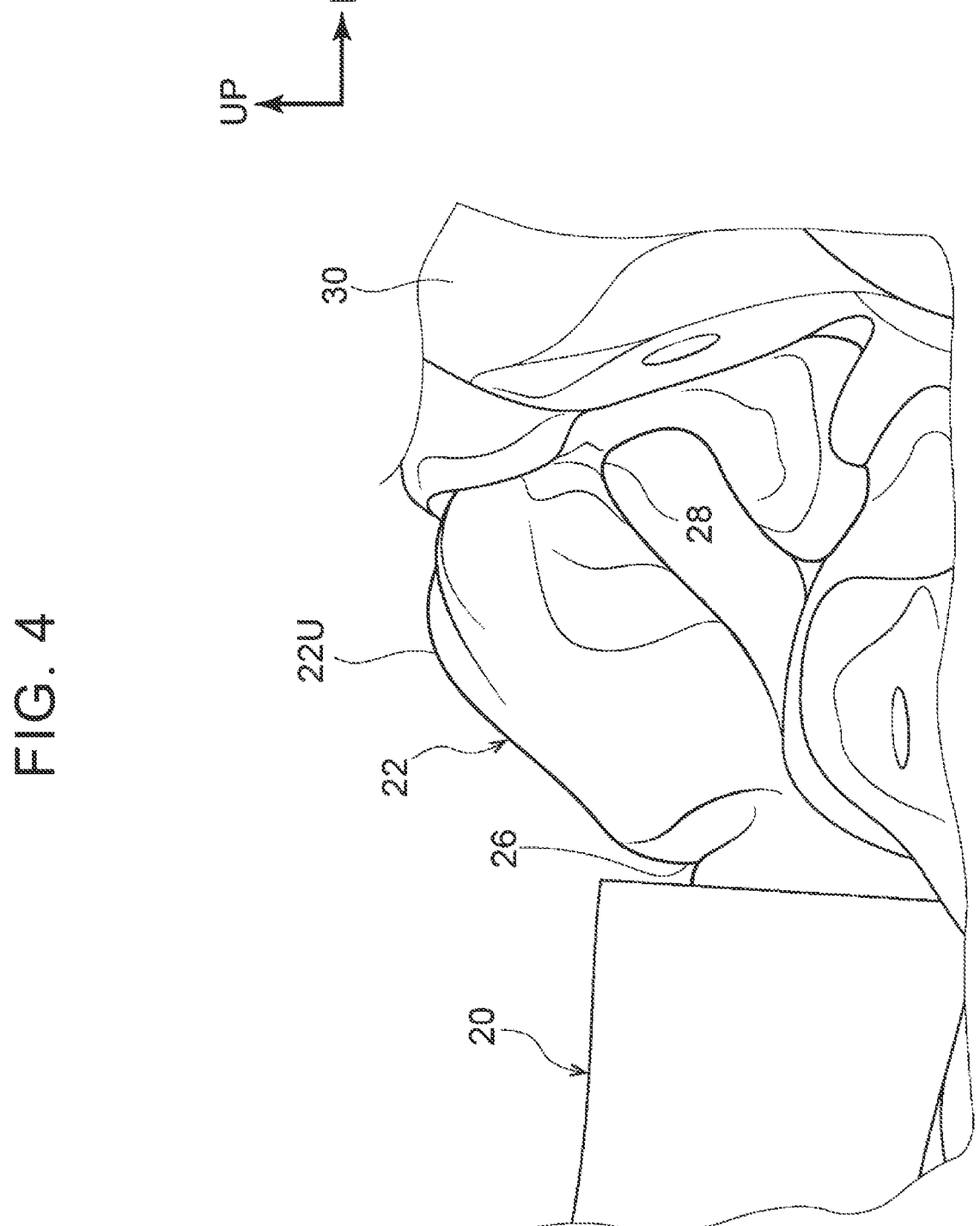
FIG. 4 is an enlarged schematic front view of a vehicle lower part structure after a side collision according to the present embodiment.

The distance D1 along the vehicle width direction between the first bead portion 24 and the third bead portion 28 is made shorter than the distance D2 along the vehicle width direction between the second bead portion 26 and the third bead portion 28. Therefore, when the impact load directed inward in the vehicle width direction is inputted to the extension 22, as shown in FIG. 4, the upper wall 22U and the lower wall 22D of the extension 22 between the first bead portion 24 and the second bead portion 26 are plastically deformed so as to be convex upward.

Figure 5A:
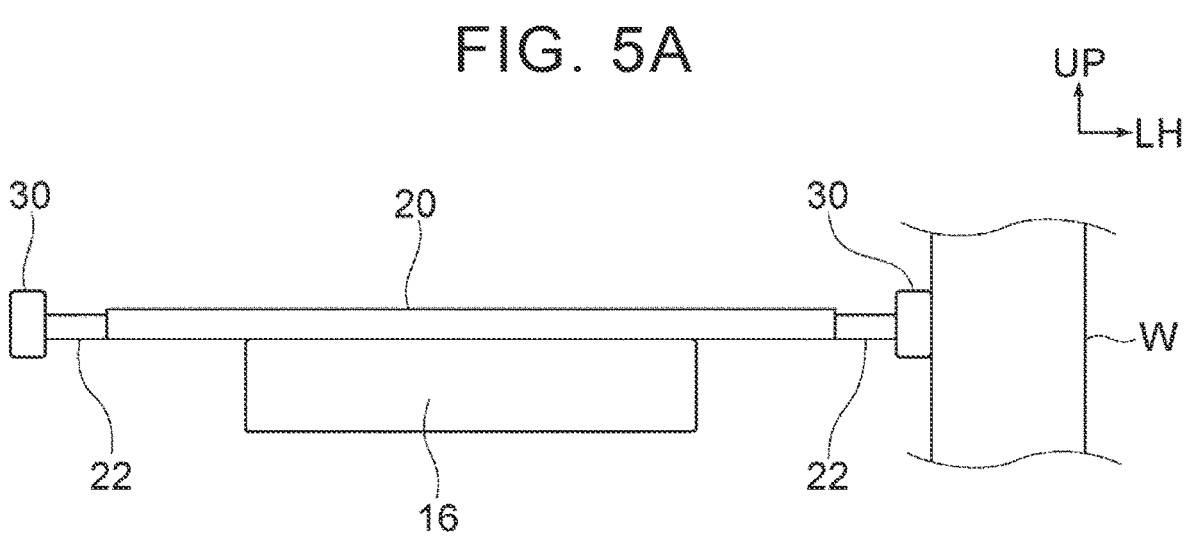
FIG. 5A is a schematic view showing a deformation process at the time of a side collision between an extension and a cross member according to the embodiment.
Figure 5B:
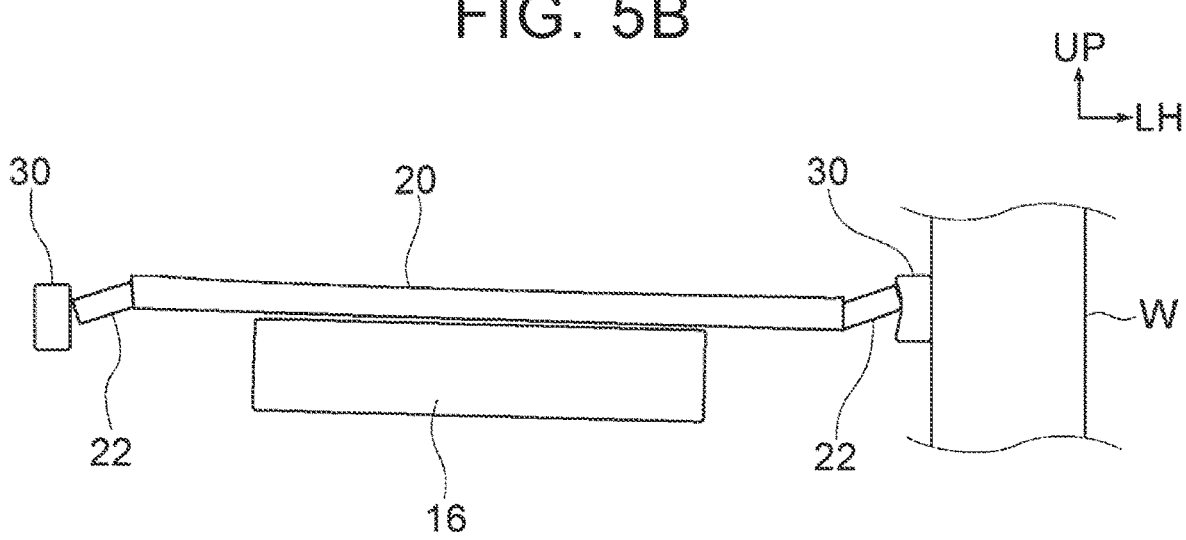
FIG. 5B is a schematic diagram showing a deformation process at the time of a side collision between an extension and a cross member according to the embodiment.

More specifically, as shown in FIG. 5A, when the vehicle 12 collides with the barrier W on a side surface, a collision load is relatively inputted to the rocker 30 from the barrier W. When the collision load is inputted to the rocker 30 from the outside in the vehicle width direction, as shown in FIG.

5B, the rocker 30 collapses inward in the vehicle width direction and absorbs a part of the collision load, and a part of the remaining collision load is transmitted to the extension 22.

Figure 5C:
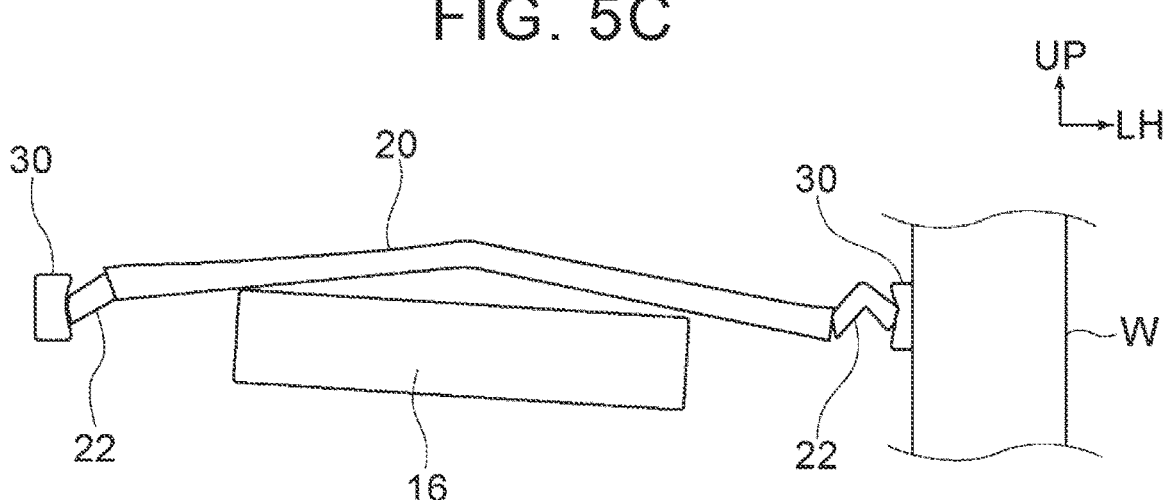
FIG. 5C is a schematic diagram showing a deformation process at the time of side collision of the extension and the cross member according to the embodiment.

When a collision load is inputted to the extension 22 from the vehicle-width-direction outer side, as shown in FIG. 5C, the extension 22 is plastically deformed so as to bend with the first bead portion 24, the third bead portion 28, and the second bead portion 26 as a base point, and absorbs the collision load. That is, the upper wall 22U and the lower wall 22D of the extension 22 between the first bead portion 24 and the second bead portion 26 are plastically deformed so as to protrude upward, and absorb the impact load.

As a result, the outer end portion of the cross member 20 in the vehicle width direction (the boundary portion between the cross member 20 and the extension 22) can be deformed downward (so as to be downwardly convex). Then, the cross member 20 can be deformed in such a manner that the substantially central portion thereof is upwardly (upwardly convex) (see FIG. 5C).

Here, the cross member 20 extends in the vehicle widthwise direction on the front side with respect to the rear side portion 18B of the seat bracket 18 that supports the front seat (specifically, the rear-side lower portion of the seat rail that slidably supports the front seat) of the vehicle 12, so that the toes of the occupants seated in the rear seat do not hit the cross member 20 via the floor panel 14.

Therefore, by the extension 22 and the cross member 20, it is possible to efficiently absorb the collision load at the time of the side collision of the vehicle 12 without narrowing the foot space of the occupant seated in the rear seat. Thus, it is possible to suppress or prevent the cross member 20 and the barrier W from hitting the battery case 16. Therefore, it is possible to effectively suppress or prevent a collision load from being input to the battery stack 17 via the battery case 16.

The third bead portion 28 formed on the lower wall 22D of the extension 22 is formed to be more fragile than the first bead portion 24 and the second bead portion 26 formed on the upper wall 22U of the extension 22. Specifically, as shown in FIG. 3, the depth (the amount of depression) of the third bead portion 28 is made deeper (larger) than the depth (the amount of depression) of the first bead portion 24 and the second bead portion 26.

Therefore, when a collision load directed inward in the vehicle widthwise direction is inputted to the extension 22 at the time of side collision of the vehicle 12, the upper wall 22U and the lower wall 22D of the extension 22 between the first bead portion 24 and the second bead portion 26 can be easily deformed so as to be convex upward. In other words, the upper wall 22U and the lower wall 22D of the extension 22 between the first bead portion 24 and the second bead portion 26 can be effectively guided (controlled) so as to protrude upward.

As described above, at least a flange portion integrally formed with the vehicle-width-direction outer end portion of the extension 22 on the upper wall 22U is joined to the rocker 30. Therefore, when a collision load is input to the extension 22 via the rocker 30, the collision load is likely to be mainly transmitted from the substantially central portion in the height direction of the extension 22 to the upper side. Therefore, even if the third bead portion 28 having a large depth (large depression amount) is formed on the lower wall 22D of the extension 22, it is possible to suppress the strength decrease of the extension 22 with respect to the impact load. Then, it is possible to suppress a decrease in energy absorption efficiency caused by the extension 22.

Further, the extension 22 has a lower rigidity than the cross member 20. Specifically, the thickness of the extension 22 is formed to be thinner than the thickness of the cross member 20. Therefore, when the impact load directed inward in the vehicle-width direction is inputted to the extension 22, the upper wall 22U and the lower wall 22D of the extension 22 between the first bead portion 24 and the second bead portion 26 can be more easily deformed so as to be convex upward.

The vehicle lower part structure 10 according to the present embodiment has been described above with reference to the drawings. However, the vehicle lower part structure 10 according to the present embodiment is not limited to the illustrated one, and can be appropriately changed in design without departing from the gist of the present disclosure. For example, the bead portion as the fragile portion formed in the extension 22 is not limited to the three illustrated portions.

A bead portion may be added to the extension 22 according to the length along the vehicle width direction. That is, in the upper wall 22U of the extension 22, one or more bead portions similar to the first bead portion 24 or the second bead portion 26 may be formed on the vehicle width direction inner side of the second bead portion 26, and one or more bead portions similar to the third bead portion 28 may be formed on the lower wall 22D of the extension 22 on the vehicle width direction inner side of the second bead portion 26.

When the length of the extension 22 along the vehicle width direction is increased and the bead portions are added to the upper wall 22U and the lower wall 22D, the additional upper and lower bead portions need not be formed at the same position in the vehicle width direction. That is, the added bead portion may not have any relation such as the distance D1 between the first bead portion 24 and the third bead portion 28 and the distance D2 between the second bead portion 26 and the third bead portion 28. Therefore, the added bead portions may be formed at equal intervals in the vehicle width direction, for example, alternately vertically.

The first fragile portion, the second fragile portion, and the third fragile portion are not limited to the first bead portion 24, the second bead portion 26, and the third bead portion 28. For example, although not shown, the first fragile portion, the second fragile portion, and the third fragile portion may be a slit-shaped first elongated hole portion, a second elongated hole portion, and a third elongated hole portion that are long in the front-rear direction. In this case, if the opening area of the third elongated hole portion is larger than the opening area of the first elongated hole portion and the second elongated hole portion, the third elongated hole portion can be made more fragile than the first elongated hole portion and the second elongated hole portion.

Further, a configuration in which the rigidity of the extension 22 is lower than the rigidity of the cross member 20 is not limited to a configuration due to a difference in plate thickness. For example, the metal material forming the extension 22 may be made of a metal material having a lower rigidity than the metal material forming the cross member 20, so that the rigidity of the extension 22 is lower than the rigidity of the cross member 20.

What is claimed is:

1. A vehicle lower part structure comprising:
   a battery case mounted on a side below a floor panel of a vehicle in an up-down direction of the vehicle;
   a cross member extending in a vehicle width direction, between the floor panel and the battery case, and forward of a rear portion of a support member in a front-rear direction of the vehicle, the support member supporting a front seat of the vehicle;
   a rocker extending in the front-rear direction of the vehicle on an outer side of the cross member in the vehicle width direction; and
   a connecting member that is constituted in a closed sectional shape and that connects an outer end portion of the cross member in the vehicle width direction and the rocker,
   wherein a first fragile portion and a second fragile portion extending in the front-rear direction of the vehicle in order from an outermost side to an inner side in the vehicle width direction in an upper wall of the connecting member, are constituted, and a third fragile portion extending in the front-rear direction of the vehicle in an lower wall of the connecting member between the first fragile portion and the second fragile portion in a front view, is constituted, and
   wherein a distance between the first fragile portion and the third fragile portion along the vehicle width direction is shorter than a distance between the second fragile portion and the third fragile portion along the vehicle width direction.

2. The vehicle lower part structure according to claim 1, wherein the third fragile portion is constituted to be more fragile than the first fragile portion and the second fragile portion.

3. The vehicle lower part structure according to claim 1, wherein the first fragile portion, the second fragile portion, and the third fragile portion are a first bead portion, a second bead portion, and a third bead portion, respectively, and a depth of the third bead portion is deeper than a depth of the first bead portion and a depth of the second bead portion.

4. The vehicle lower part structure according to claim 1, wherein the connecting member has lower rigidity than the cross member.

* * * * *